United States Patent
Nigam et al.

(10) Patent No.: US 10,136,455 B2
(45) Date of Patent: Nov. 20, 2018

(54) MACHINE TO MACHINE COMMUNICATIONS IN A MULTIPLE M2M DEVICE GROUP ZONE ENVIRONMENT

(71) Applicant: Samsung Electronics Co., Ltd., Suwon-si, Gyeonggi-do (KR)

(72) Inventors: Anshuman Nigam, Bangalore (IN); Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 14/354,468

(22) PCT Filed: Oct. 25, 2012

(86) PCT No.: PCT/KR2012/008814
§ 371 (c)(1),
(2) Date: Apr. 25, 2014

(87) PCT Pub. No.: WO2013/062331
PCT Pub. Date: May 2, 2013

(65) Prior Publication Data
US 2014/0269518 A1     Sep. 18, 2014

(30) Foreign Application Priority Data

Oct. 25, 2011  (IN) ........................ 3656/CHE/2011

(51) Int. Cl.
*H04L 29/08* (2006.01)
*H04W 4/70* (2018.01)
(Continued)

(52) U.S. Cl.
CPC ....... *H04W 76/021* (2013.01); *H04L 67/1044* (2013.01); *H04W 4/70* (2018.02); *H04W 76/11* (2018.02); *H04W 4/08* (2013.01)

(58) Field of Classification Search
CPC . H04B 7/2612; H04L 12/189; H04L 67/1044; H04W 4/005; H04W 4/06;
(Continued)

(56) References Cited

U.S. PATENT DOCUMENTS

2004/0064693 A1* 4/2004 Pabla ..................... H04L 63/02
713/168
2004/0203342 A1  10/2004 Sibecas et al.
(Continued)

FOREIGN PATENT DOCUMENTS

| KR | 10-2005-0019916 A | 3/2005 | |
|---|---|---|---|
| KR | 10-2008-0005143 A | 1/2008 | |
| WO | WO 2009132255 A2 * | 10/2009 | .......... H04W 72/005 |

OTHER PUBLICATIONS

IEEE; WirelessMAN—Advanced Air Interface for Broadband Wireless Access Systems; Enhancements to Support Machine-to-Machine Applications; XP017781303; Aug. 30, 2011; Piscataway, NJ.
(Continued)

*Primary Examiner* — Marsha D Banks Harold
*Assistant Examiner* — Dharmesh J Patel
(74) *Attorney, Agent, or Firm* — Jefferson IP Law, LLP

(57) ABSTRACT

A method and a system apparatus for providing Machine to Machine (M2M) communications in a multiple M2M device group zone environment are provided. The method for performing communication by an M2M device in an M2M communication system includes determining zone indexes corresponding to one or more zone identifiers assigned to one or more M2M device group zones of the base station, selecting a zone index corresponding to a zone identifier of the M2M device group zone associated with a M2M device group of a M2M device from the determined zone indexes, and performing communication with the base station by
(Continued)

using the selected zone index and a M2M device group identifier associated with the M2M device group of the M2M device.

28 Claims, 6 Drawing Sheets

(51) Int. Cl.
*H04W 76/11* (2018.01)
*H04W 4/08* (2009.01)
*H04W 76/02* (2009.01)

(58) Field of Classification Search
CPC ......... H04W 4/08; H04W 8/26; H04W 68/00; H04W 72/005; H04W 72/0406; H04W 74/006; H04W 76/021
See application file for complete search history.

(56) References Cited

U.S. PATENT DOCUMENTS

| | | | |
|---|---|---|---|
| 2008/0009283 A1* | 10/2008 | Lim | 455/432.3 |
| 2008/0267153 A1 | 10/2008 | Mukherjee et al. | |
| 2009/0154386 A1* | 6/2009 | So | H04W 76/002 370/311 |
| 2009/0239555 A1* | 9/2009 | Sim | H04W 8/186 455/458 |
| 2010/0048165 A1* | 2/2010 | Caldwell | 455/406 |
| 2011/0128911 A1 | 6/2011 | Shaheen | |
| 2011/0201365 A1 | 8/2011 | Segura | |

OTHER PUBLICATIONS

IEEE; Air Interface for Broadband Wireless Access Systems—Enhancements to Support Machine-to-Machine Applications; XP017716161; Oct. 1, 2011; Piscataway, NJ.

L. Popova, et al., "Cooperative mobile-to-mobile file dissemination in cellular networks within a unified radio interface," Computer Network, vol. 52, pp. 115-1165, (Apr. 2008).

Korean Office Action dated Oct. 1, 2018, issued in the Korean application No. 10-2014-7013933.

\* cited by examiner

| ZONE IDENTIFIERS | ZONE INDEXES |
|---|---|
| ZONE IDENTIFIER (502A) | ZONE INDEX (504A) |
| ZONE IDENTIFIER (502B) | ZONE INDEX (504B) |
| ZONE IDENTIFIER (502C) | ZONE INDEX (504C) |
| ⋮ | ⋮ |

IMPLICIT ORDERING

FIG.5 — 500

| CRC MASKS | ZONE INDEXES |
|---|---|
| CRC MASK (602A) | ZONE INDEX (604A) |
| CRC MASK (602B) | ZONE INDEX (604B) |
| CRC MASK (602C) | ZONE INDEX (604C) |
| ⋮ | ⋮ |

FIG.6 — 600

MACHINE TO MACHINE COMMUNICATIONS IN A MULTIPLE M2M DEVICE GROUP ZONE ENVIRONMENT

CROSS-REFERENCE TO RELATED APPLICATION(S)

This application is a U.S. National Stage application under 35 U.S.C. § 371 of an International application filed on Oct. 25, 2012 and assigned application number PCT/KR2012/008814, which claimed the benefit of a Indian patent application filed on Oct. 25, 2011 in the Indian Intellectual Property Office and assigned Serial number 3656/CHE/2011, the entire disclosure of which is hereby incorporated by reference.

TECHNICAL FIELD

The present disclosure relates to the field of Machine to Machine (M2M) communication systems, and more particularly relates to M2M communications in a multiple M2M device group zone environment.

BACKGROUND

Broadband wireless networks based on various standards (e.g., Institute for Electronic and Electrical Engineers (IEEE) 802.16e based WiMAX standard and its evolution to IEEE 802.16m) provides various types of services such as voice, packet data, and so on. Recently, IEEE 802.16m and IEEE 802.16e based standards are being considered to enable Machine to Machine (M2M) communications for applications such as smart grid, vehicular tracking, healthcare etc. For efficient communication between the broadband wireless network and M2M devices, the M2M devices having similar traffic characteristics are grouped to form a M2M device group. Also, a plurality of base stations are grouped together to form a M2M device group zone. An M2M device group identifier (also known as MGID) is assigned to one or more M2M devices belonging to a M2M device group in a M2M device group zone to uniquely identify M2M devices belonging to a particular M2M device group in a M2M device group zone. For example, a network entity controls assignment of a M2M device group identifier to one or more M2M devices in each M2M device group zone.

A base station in the wireless network according to the related art used to be part of only one M2M device group zone. In such case, the base station broadcasts a zone identifier of the M2M device group zone to which it belongs to the M2M devices in the M2M device group zone. When the M2M device moves from the one M2M device group zone to another M2M device group zone, the M2M device group identifier assigned to the M2M device is updated.

In order to avoid frequent update of M2M device group identifier at the boundary of M2M device group zones because of M2M device mobility (e.g., Ping Pong Scenario), the base stations at the border of M2M device group zones are being considered to be part of multiple M2M device group zones. However, the base station being part of multiple M2M device group zones may lead to collisions of M2M device group identifiers between multiple M2M devices communicating with the base station but belonging to different M2M device group zones. As a result, a signaling message transmitted using the M2M device group identifier meant for M2M devices of one M2M device group may also reach the M2M devices having same MGID of another M2M device group which falls under a different M2M device group zone. For example, consider that an M2M device 1 is assigned MGID 1 in an M2M device group zone 1 and is communicating with a base station 1, while an M2M device 2 is assigned a MGID 1 in a M2M device group zone 2 and is communicating with a base station 2. Now consider that the M2M device 1 moves from the base station 1 to the base station 2, wherein the base station 1 is part of the M2M device group zone 1 and the base station 2 is part of the M2M device group zone 1 and the M2M device group zone 2. When the M2M device 1 moves to the base station 2, the base station 2 has to communicate with two M2M devices having the same MGID since the MGID is not updated for the M2M device 1 as the base station 2 is also part of the M2M device group zone 1 to which the M2M device 1 belongs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for Machine to Machine (M2M) communications in a multiple M2M device group zone environment.

In accordance with an aspect of the present disclosure, a method for performing communication by a M2M device in an M2M communication system is provided. The method includes determining zone indexes corresponding to one or more zone identifiers assigned to one or more M2M device group zones of the base station, selecting a zone index corresponding to a zone identifier of a M2M device group zone associated with a M2M device group of the M2M device from the determined zone indexes, and performing communication with the base station by using the selected zone index and a M2M device group identifier associated with the M2M device group of the M2M device.

In accordance with another aspect by the present disclosure, a method performing communication by a base station in a Machine to Machine (M2M) communication system is provided. The method includes determining zone indexes corresponding to one or more zone identifiers assigned to one or more M2M device group zones associated with the base station, selecting a zone index corresponding to a zone identifier of a M2M device group zone associated with a M2M device group from the determined zone indexes, and performing communication with M2M devices in the M2M device group in the M2M device group zone by using the selected zone index and a M2M device group identifier associated with the M2M device group.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a tabular representation of zone identifiers and corresponding zone indexes assigned according to implicit ordering of zone identifiers according to an embodiment of the present disclosure;

FIG. 6 is a tabular representation of Cyclic Redundancy Check (CRC) masks and corresponding zone indexes;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a method and system for providing Machine to Machine (M2M) communications in a multiple M2M device group zone environment. In the following detailed description of the various embodiments of the present disclosure, reference is made to the accompanying drawings that form a part hereof, and in which are shown by way of illustration specific embodiments in which the present disclosure may be practiced. These various embodiments are described in sufficient detail to enable those skilled in the art to practice the present disclosure, and it is to be understood that other various embodiments may be utilized and that changes may be made without departing from the scope of the present disclosure. The following detailed description is, therefore, not to be taken in a limiting sense, and the scope of the present disclosure is defined only by the appended claims.

Figure 1:
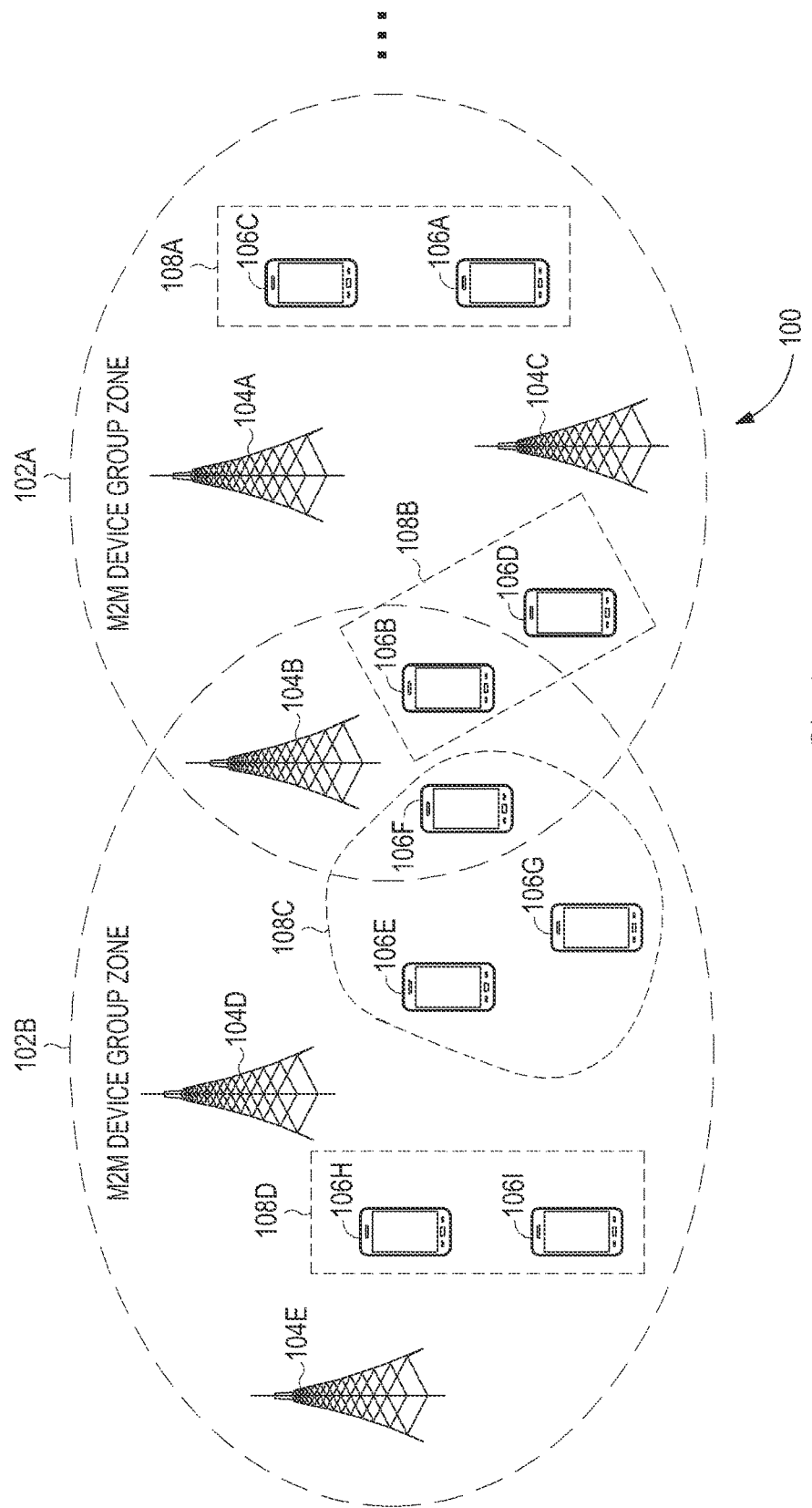
FIG. 1 is a schematic diagram illustrating a multiple Machine to Machine (M2M) device group zone environment, according to an embodiment of the present disclosure.

FIG. 1 is a schematic diagram illustrating a multiple M2M device group zone environment according to an embodiment of the present disclosure.

Referring to FIG. 1, the M2M device group zone environment 100 includes a plurality of M2M device group zones 102A-N. For the purpose of illustration, the M2M group zones 102A and 102B are shown as part of the M2M device group zone environment 100. The M2M device group zone 102A contains base stations 104A-C and M2M devices 106A-D. The M2M devices 106A and 106C are grouped to form a M2M device group 108A while the M2M devices 106B and 106D are grouped to form a M2M device group 108B. Similarly, the M2M device group zone 102B contains base stations 104B, 104D and 104E, and M2M devices 106E-I. In the M2M group zone 102B, the M2M devices 106E-G are grouped to form a M2M device group 108C while the M2M devices 106H and 106I are grouped to form a M2M device group 108D. In FIG. 1, the base station 104B is associated with both the M2M device group zones 102A and 102B. The maximum number of M2M device group zones to which a base station may belong is pre-defined by a network.

In the M2M device group zone environment 100, each of the M2M device group zones is identified based on its respective zone identifier. Similarly, within each M2M device group zone, each of the M2M device groups is identified based on its respective M2M device group identifier. Hence, one or more M2M devices belonging to the respective M2M group are assigned associated M2M device group identifier and a zone identifier of a M2M device group zone in which the M2M device group identifier is valid. For example, M2M device group identifiers associated with the M2M device groups 108A and 108B are valid in the M2M device group zone 102A. Similarly, M2M device group identifiers associated with the M2M device groups 108C and 108D are valid in the M2M device group zone 102B.

In an example, consider that a M2M device (e.g., a M2M device 106B) belonging to the M2M device group 108B is in the M2M device group zone 102A and is camped on the base station 104B. Also, consider that the M2M device (e.g., M2M device 106F) belonging to the M2M device group 108C is in the M2M device group zone 102B and is camped on the base station 104B. Now consider that, both the M2M devices 106B and 106F are assigned same M2M device group identifiers.

Suppose, the base station 104B wishes to transmit control information to the M2M device 106B of the M2M device group 108B in the M2M device group zone 102A. According to an embodiment of the present disclosure, the base station 104B broadcasts zone identifier information to the M2M devices 106A-I. The zone identifier information includes zone identifiers of the M2M group zones 102A and 102B associated with the base station 104B. The M2M devices 106B and 106F computes zone indexes corresponding to the zone identifiers based on implicit ordering of the zone identifiers in the zone identifier information. The zone indexes are local indexes assigned to the M2M device group zones 102A and 102B associated with the base station 104B. Then, the M2M devices 106B and 106F select a zone index corresponding to a zone identifier of a M2M device group zone in which their respective M2M device group identifiers are valid from the computed zone indexes. For example, the M2M device 106B selects a zone index corresponding to the zone identifier of the M2M device group zone 102A while the M2M device 106F selects a zone index corresponding to the zone identifier of the M2M device group zone 102B.

The base station 104B also computes zone indexes corresponding to the zone identifiers based on implicit ordering of the zone identifiers in the zone identifier information. Further, the base station 104B selects a zone index corresponding to a zone identifier of the M2M device group zone 102A from the computed zone indexes. The base station 104B includes the M2M device group identifier of the M2M device group 108B and/or the zone index of the M2M device group zone 102A in a signaling message containing control information and transmits the signaling message to the M2M devices 106B and 106F. The M2M devices 106B and 106F determine whether the M2M device group identifier and the zone index in the signaling matches with the M2M device group identifier of associated M2M device group 108C and the selected zone index associated with the M2M device group zone 102B respectively. The M2M device 106F determines that the M2M device group identifier and the zone index in the signaling message do not match with its M2M device group identifier and the selected zone index and hence discards the signaling message.

On the other hand, the M2M device 106B determines that the M2M device group identifier and the zone index in the signaling message matches with its M2M device group identifier and the selected zone index and hence processes the signaling message. In this manner, a M2M device group identifier in conjunction with a zone index enables a M2M device to uniquely identify a M2M device group to which a signaling message is intended by a base station when the base station is part of multiple M2M device group zones. Similarly, a M2M device group identifier in conjunction with a zone index enables a base station to uniquely identify a M2M device group from which a message is received when the base station is part of multiple M2M device group zones and same M2M device group identifiers are shared with different M2M devices in different M2M device group zones associated with the base station. This and other various embodiments of the present disclosure are described in greater detail in the description that follows.

Figure 2:
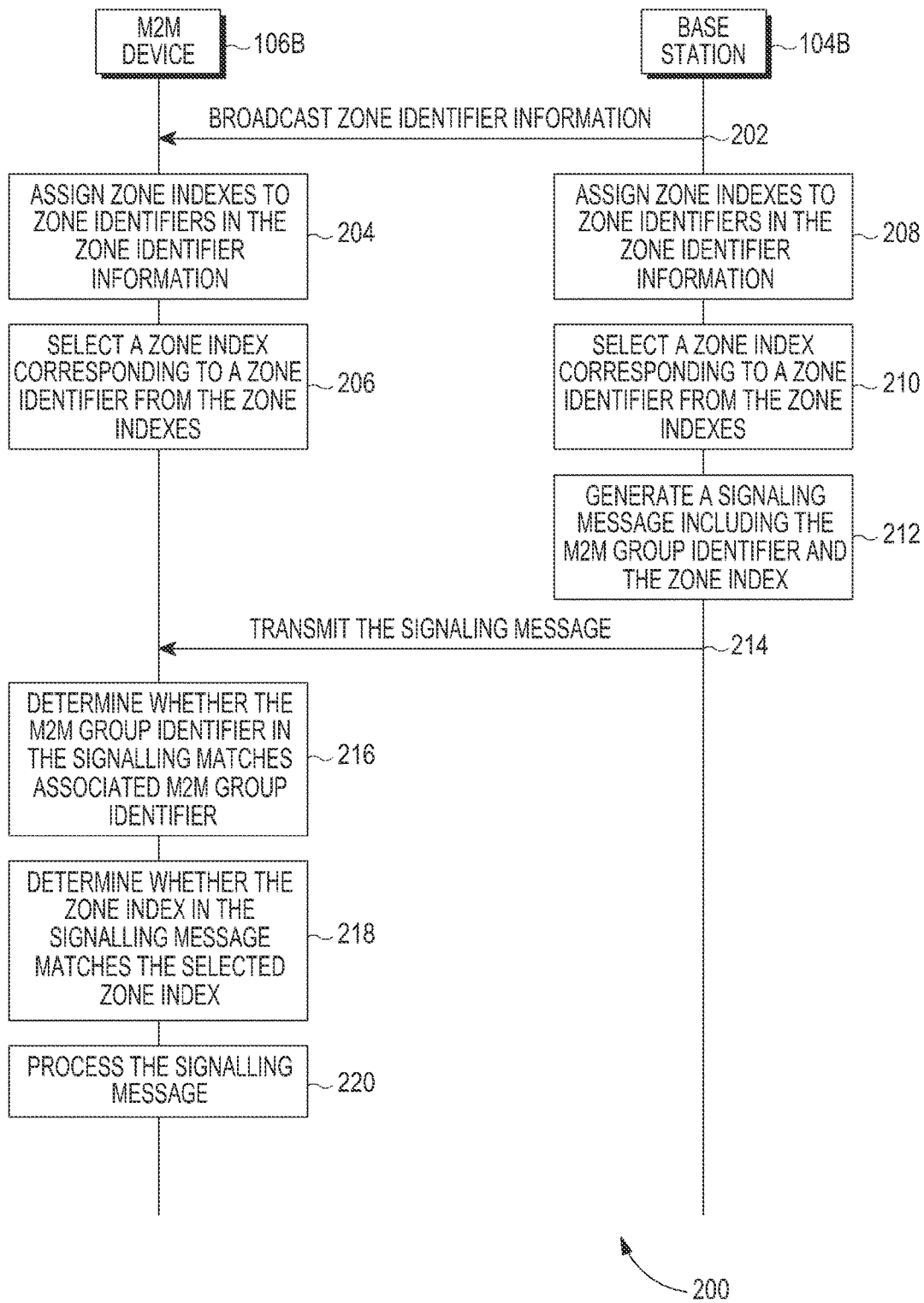
FIG. 2 is a flow diagram illustrating a method of communicating control information with a M2M device, according to an embodiment of the present disclosure.

FIG. 2 is a flow diagram illustrating a method of communicating control information with a M2M device according to an embodiment of the present disclosure.

Referring to the flow diagram 200 of FIG. 2, consider that the M2M device 106B belonging to the M2M device group 108B in the M2M device group zone 102A is assigned a M2M Device Group Identifier (MGID1) and is camped on the base station 104A. Now consider that, during the idle mode, the M2M device 106B moves from the base station 104A to the base station 104B, where the base station 104A is a part of the M2M device group zone 102A and the base station 104B is a part of the M2M device group zones 102A and 102B.

During a paging available period, the base station 104B broadcasts zone identifier information to a M2M device group(s), at operation 202. The zone identifier information includes zone identifiers identifying M2M device group zones 102A and 102B associated with the base station 104B. In some embodiments, the base station 104B broadcasts the zone identifier information in system information messages.

Upon receiving a broadcast message, at operation 204, the M2M device 106B of the M2M device group 108B assigns zone indexes to the zone identifiers in the zone identifier information based on their implicit ordering in the zone identifier information. The zone indexes are local indexes assigned to the M2M device group zones 102A and 102B associated with the base station 104B.

FIG. 5 is a tabular representation of zone identifiers and corresponding zone indexes assigned according to implicit ordering of zone identifiers according to an embodiment of the present disclosure.

Referring to FIG. 5, in table 500 each set of zone identifiers is associated with a distinct zone index. For example, a zone index 504A corresponds to a zone identifier 502A, a zone index 504B corresponds to a zone identifier 502B, a zone index 504C corresponds to a zone identifier 502C, and so on. In an embodiment of the present disclosure, if the base station 104B serves two M2M device zones 102A and 102B, a zone identifier 502A and zone identifier 502B would be assigned zone index 504A and zone index 504B respectively. That is, a first zone identifier 502A in the zone identifier information is assigned a zone index '0' while the next zone identifier 502B is assigned a zone index '1'. The last zone index assigned to a last zone identifier in the zone identifier information will be equal to (maximum number of M2M device group zone(s) supported by the base station−1). At operation 206, the M2M device 106B selects a zone index corresponding to a zone identifier of associated M2M device group zone 102A. For example, since the M2M device 106B belongs to the M2M device group 108B in the M2M device group zone 102A, the M2M device 106B selects zone index corresponding the zone identifier associated with the M2M device group zone 102A.

At operation 208, the base station 104B assigns a zone index to each of the zone identifiers based on implicit ordering of the zone identifiers in the zone identifier information. For example, a first zone identifier in the zone identifier information is assigned a zone index '0' while the next zone identifier is assigned a zone index '1'. At operation 210, the base station 104B selects a zone index corresponding to a zone identifier of the M2M device group zone 102A. At operation 212, the base station 104B generates a signaling message (e.g., a paging advertisement message) intended for the M2M devices 106B and 106D belonging to the M2M device group 108B in the M2M device group zone 102A. In various embodiments, the base station 104B includes a M2M device group identifier of the M2M device group 108B and a zone index corresponding to a zone identifier of the M2M device group zone 102A in the signaling message. At operation 214, the base station 104B transmits the signaling message containing the M2M device group identifier and the zone index to the M2M devices 106B and 106D of the M2M device group 108B in the M2M device group zone 102A.

At operation 216, the M2M device 106B determines whether the M2M device group identifier in the signaling message matches with the M2M device group identifier associated with the M2M device group 108B of the M2M device 106B. At operation 218, the M2M device 106B determines whether the zone index in the signaling message matches with the selected zone index. If the M2M device group identifier and the zone index in the signaling message matches with the M2M device group identifier of the M2M device group and the selected zone index respectively, then the matching implies that the signaling message is intended for the M2M device 106B. At operation 220, the M2M device 106B processes the signaling message since the M2M device group identifier and the zone index in the signaling message matches with the M2M device group identifier of the M2M device group 108B and the selected zone index respectively.

Figure 3:
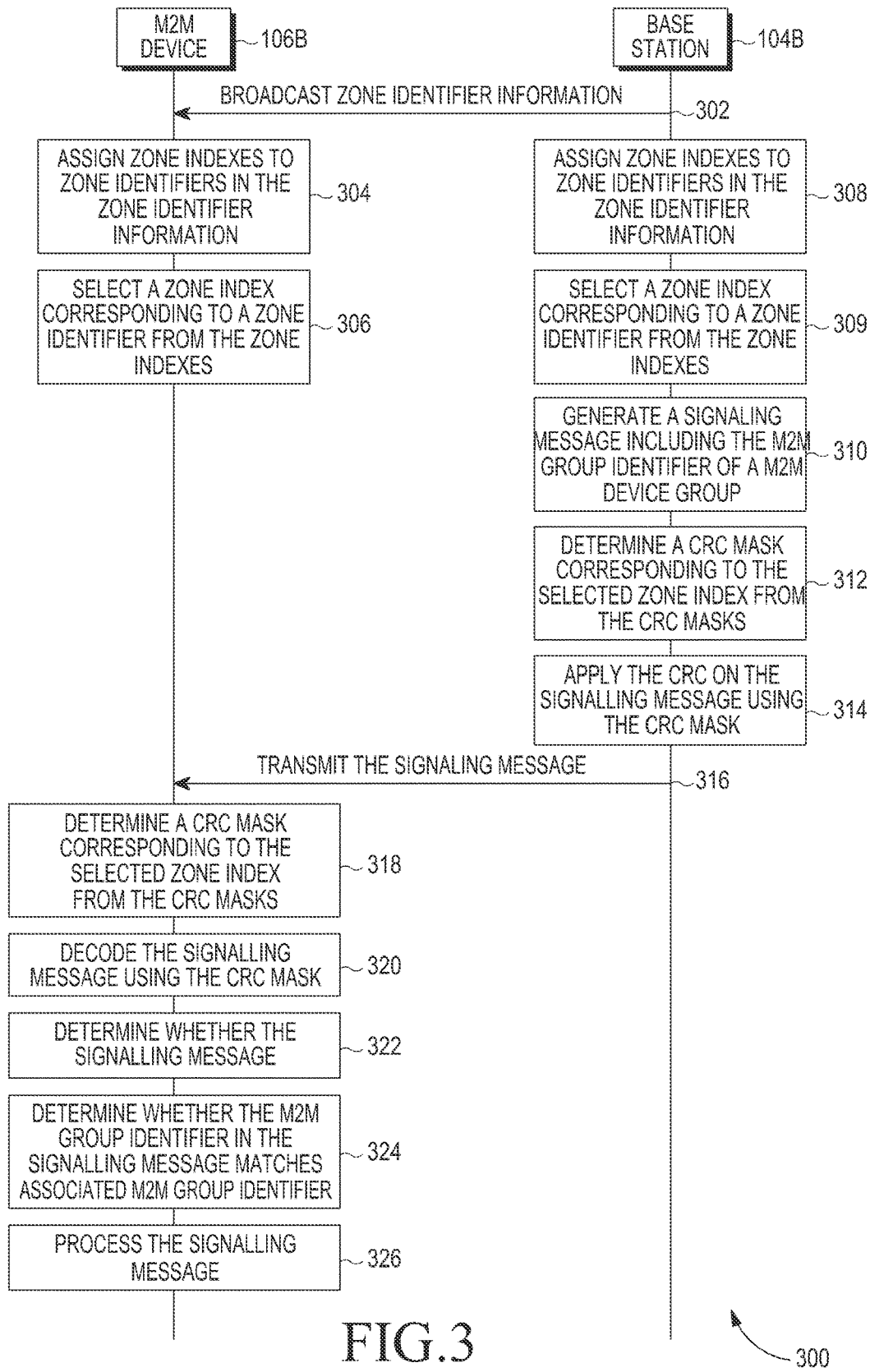
FIG. 3 is a flow diagram illustrating a method of communicating control information with a M2M device during connected mode of operation, according to an embodiment of the present disclosure.

FIG. 3 is a flow diagram illustrating a method of communicating control information with a M2M device during a connected mode of operation according to an embodiment of the present disclosure.

Referring to the flow diagram 300 of FIG. 3, consider that the M2M device 106B belonging to the M2M device group 108B is in the M2M device group zone 102A and is served by the base station 104B. At operation 302, the base station 104B broadcasts zone identifier information to the M2M device group 108B. At operation 304, the M2M device 106B of the M2M device group assigns zone indexes to the zone identifiers in the zone identifier information based on their implicit ordering in the zone identifier information. At operation 306, the M2M device 106B selects a zone index corresponding to a zone identifier of a M2M device group zone 102A.

At operation 308, the base station 104B assigns a zone index to each of the zone identifiers based on implicit ordering of the zone identifiers in the zone identifier information. At operation 309, the base station 104B selects a zone index corresponding to a zone identifier of the M2M device group zone 102A from the assigned zone indexes. At operation 310, the base station 104B generates a signaling message (e.g., A-MAP information element carrying resource allocation information) intended for the M2M devices 106B and 106D belonging to the M2M device group 108B in the M2M device group zone 102A. In various embodiments, the base station 104B includes a M2M device group identifier of the M2M device group 108B in the signaling message.

At operation 312, the base station 104B determines a Cyclic Redundancy Check (CRC) mask corresponding to the selected zone index from a set of CRC masks.

FIG. 6 is a tabular representation of CRC masks and corresponding zone indexes according to an embodiment of the present disclosure.

Referring to FIG. 6, in table 600 each of the set of CRC masks is associated with a distinct zone index. For example, a zone index 604A corresponds to a CRC mask 602A, a zone index 604B corresponds to a CRC mask 602B, a zone index 604C corresponds to a CRC mask 602C, and so on. In various embodiments of the present disclosure, the base station 104B associates a set of CRC masks with a plurality of zone indexes. In these various embodiments of the present disclosure, the base station 104B transmits the set of CRC masks and the plurality of associated zone indexes to the M2M devices 106B and 106D of the M2M device group 108B in the M2M device group zone 102A.

If the zone index associated with the M2M device group zone 102A is 'zone index 604B', then at operation 312, the base station 104B determines a CRC mask which corresponds to the zone index 602B (i.e., the CRC mask 602B) using the table 600 shown in FIG. 6. At operation 314, the base station 104B applies CRC on the signaling message containing the M2M device group identifier using the CRC mask. At operation 316, the base station 104B transmits the signaling message containing the M2M device group identifier to the M2M devices 106B and 106D of the M2M device group 108B in the M2M device group zone 102A.

Consider that, the M2M device 106B receives the signaling message including the zone index from the base station 104B. At operation 318, the M2M device 106B determines a CRC mask corresponding to the zone index selected in operation 306 from the set of CRC masks. In various embodiments of the present disclosure, the base station 104B unicasts or broadcasts the set of CRC masks prior to transmitting the signaling message. Referring to FIG. 6, if the zone index associated with the M2M device group zone 102A is 'zone index 604B', then at operation 318, the M2M device 106B determines a CRC mask which corresponds to the zone index 604B (i.e., the CRC mask 602B). At operation 320, the M2M device 106B decodes the signaling message using the determined CRC mask. At operation 322, the M2M device 106B determines whether the signaling message is successfully decoded. If the signaling message is successfully decoded, then at operation 324, the M2M device 106B determines whether the M2M device group identifier in the signaling message matches with the M2M device group identifier associated with the M2M device group 108B of the M2M device 106B.

If the M2M device group identifier in the signaling message matches with the M2M device group identifier of the M2M device group 108B of the M2M device 106B, then the matching implies that the signaling message is intended for the M2M device 106B. At operation 326, the M2M device 106B processes the signaling message since the M2M device group identifier in the signaling message matches with the M2M device group identifier of the M2M device group 108B.

Figure 4:
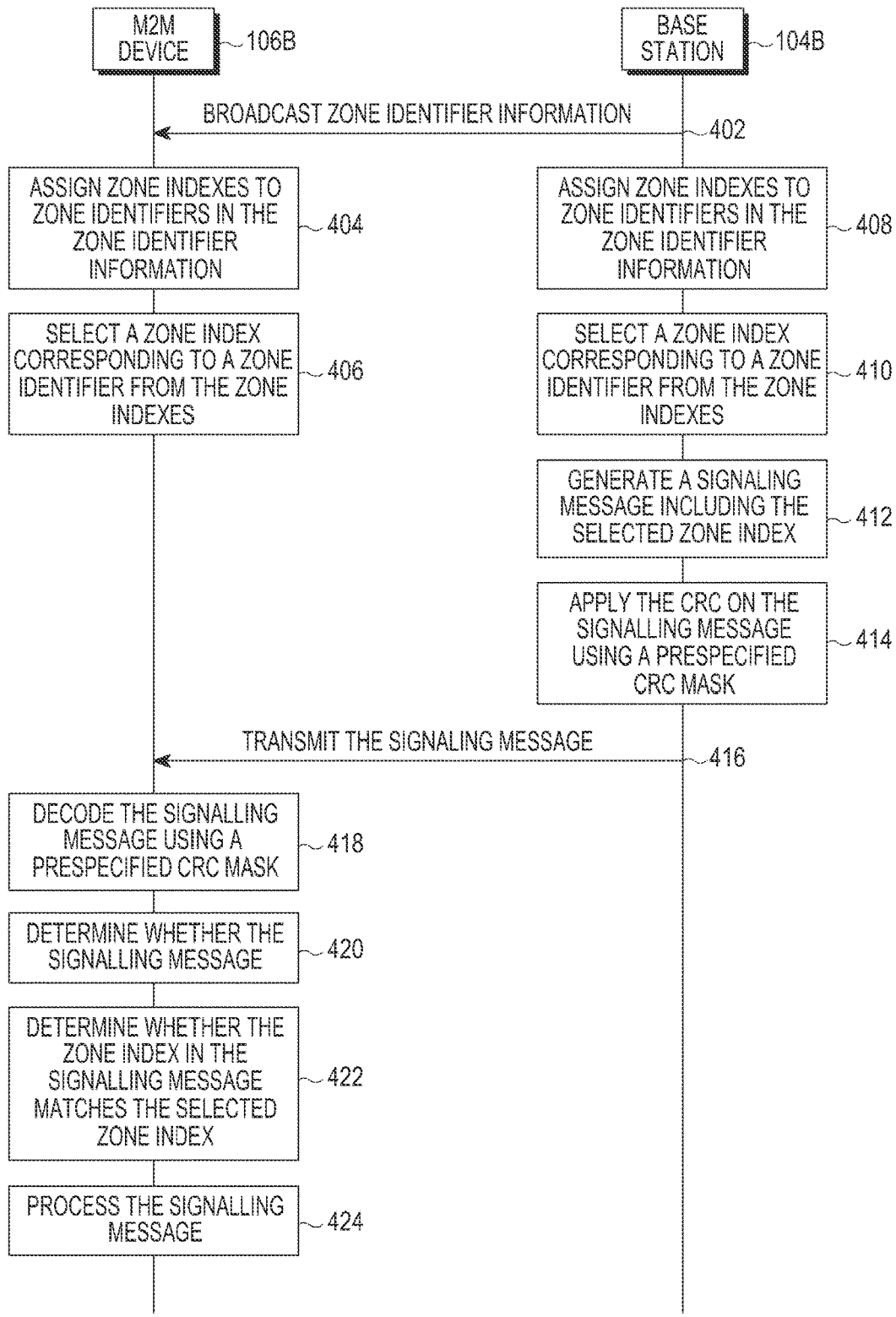
FIG. 4 is a flow diagram illustrating a method of communicating control information with a M2M device during connected mode of operation, according to an embodiment of the present disclosure.

FIG. 4 is a flow diagram illustrating a method of communicating control information with a M2M device during a connected mode of operation according to another embodiment of the present disclosure.

Referring to the flow diagram 400 of FIG. 4 at operation 402, the base station 104B broadcasts zone identifier information to the M2M device 106B of the M2M device group 108B. At operation 404, the M2M device 106B of the M2M device group 108B assigns zone indexes to the zone identifiers in the zone identifier information based on their implicit ordering in the zone identifier information. At operation 406, the M2M device 106B selects a zone index corresponding to a zone identifier of the M2M device group zone 102A.

At operation 408, the base station 104B assigns a zone index to each of the zone identifiers based on implicit ordering of the zone identifiers in the zone identifier information. At operation 410, the base station 104B selects a zone index corresponding to a zone identifier of the M2M device group zone 102A from the assigned zone indexes. At operation 412, the base station 104B generates a signaling message intended for the M2M devices 106B and 106D belonging to the M2M device group 108B in the M2M device group zone 102A. In various embodiments of the present disclosure, the base station 104B includes the selected zone index in the signaling message.

At operation 414, the base station 104B applies CRC on the signaling message containing the zone index using a pre-specified CRC mask. In various embodiments of the present disclosure, the pre-defined CRC mask corresponds to the M2M device group identifier of the M2M device group 108B. At operation 416, the base station 104B transmits the signaling message containing the M2M device group identifier to the M2M devices 106A to 106D of the M2M device group 108B in the M2M device group zone 102A.

Consider that, the M2M device 106B receives the signaling message including the zone index from the base station 104B. At operation 418, the M2M device 106B decodes the signaling message using a CRC mask pre-specified for the M2M device group identifier of the M2M device group 108B. At operation 420, the M2M device 106B determines whether the signaling message is successfully decoded. If the signaling message is successfully decoded, then at operation 422, the M2M device 106B determines whether the zone index in the signaling message matches with the zone index corresponding to the zone identifier of the M2M device group zone 102A.

If the match is found, then the matching implies that the signaling message is intended for the M2M device 106B. At operation 424, the M2M device 106B processes the signaling message since the zone index in the signaling message matches with the zone index associated with the M2M device group zone 102A.

Figure 7:
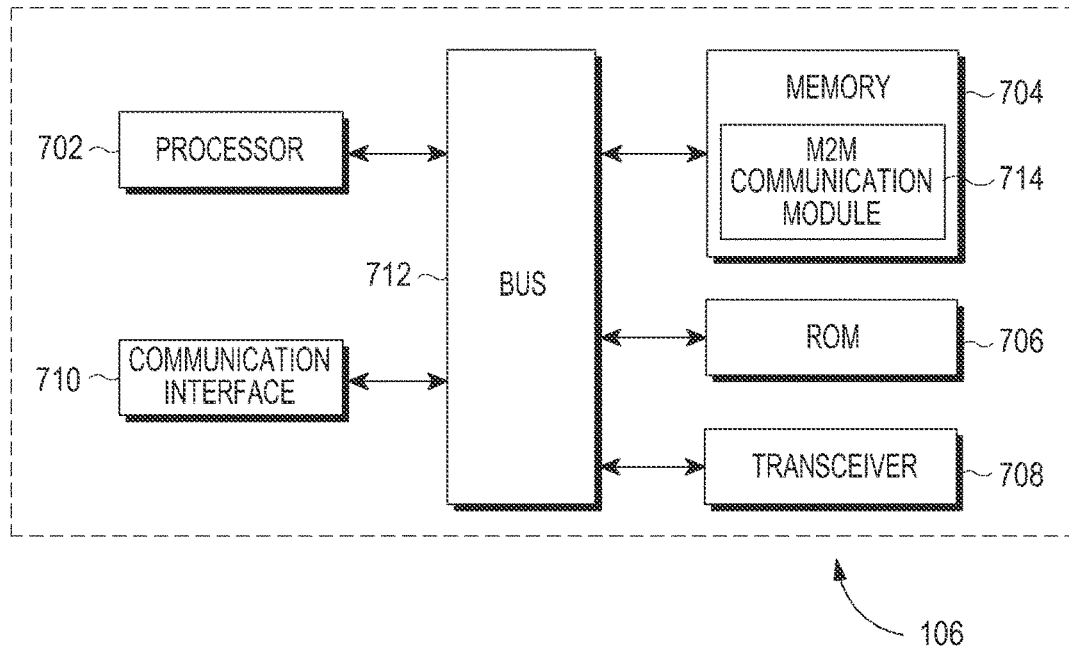
FIG. 7 illustrates a block diagram of a M2M device, such as those shown in FIG. 1 according to an embodiment of the present disclosure.

FIG. 7 illustrates a block diagram of a M2M device, such as those shown in FIG. 1 according to an embodiment of the present disclosure.

Referring to FIG. 7, the M2M device 106 includes a processor 702, memory 704, a read only memory (ROM) 706, a transceiver 708, a communication interface 710, and a bus 712.

The processor 702, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 may be a volatile memory and/or a non-volatile memory. The memory 704 may include a M2M communication module 714 for computing zone indexes corresponding to zone identifiers, selecting a zone index corresponding to associated zone identifier from the computed zone indexes and using the selected zone identifier in conjunction with a M2M device group identifier to communicate with a base station (e.g., the base station 104B), according to the various embodiments illustrated in FIGS. 1 to 4. A variety of computer-readable storage media may be stored in and accessed from the memory elements. Memory elements may include any suitable memory device(s) for storing data and machine-readable instructions such as read only memory, Random Access Memory (RAM), Erasable Programmable Read Only Memory (EPROM), Electrically Erasable Programmable Read Only Memory (EEPROM), Hard Drive (HD), removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. The M2M communication module 714 may be stored in the form of machine-readable instructions on any of the above-mentioned storage media and is executable by the processor 702. For example, a computer program may include the machine-readable instructions capable of computing zone indexes corresponding to zone identifiers, selecting a zone index corresponding to associated zone identifier from the computed zone indexes and using the selected zone identifier in conjunction with a M2M device group identifier to communicate with a base station (e.g., the base station 104B), according to the teachings and herein described various embodiments of the present subject matter. The computer program may be included on a non-transitory computer-readable storage medium and loaded from the storage medium onto a hard drive in the non-volatile memory.

The transceiver 708 is configured for transmitting and receiving information/data to/from the BSs 104A-C using the zone index and the M2M device group identifier. The components such as the ROM 706, the communication interface 710, and the bus 712 are well known to the person skilled in the art and hence the explanation is thereof omitted.

Figure 8:
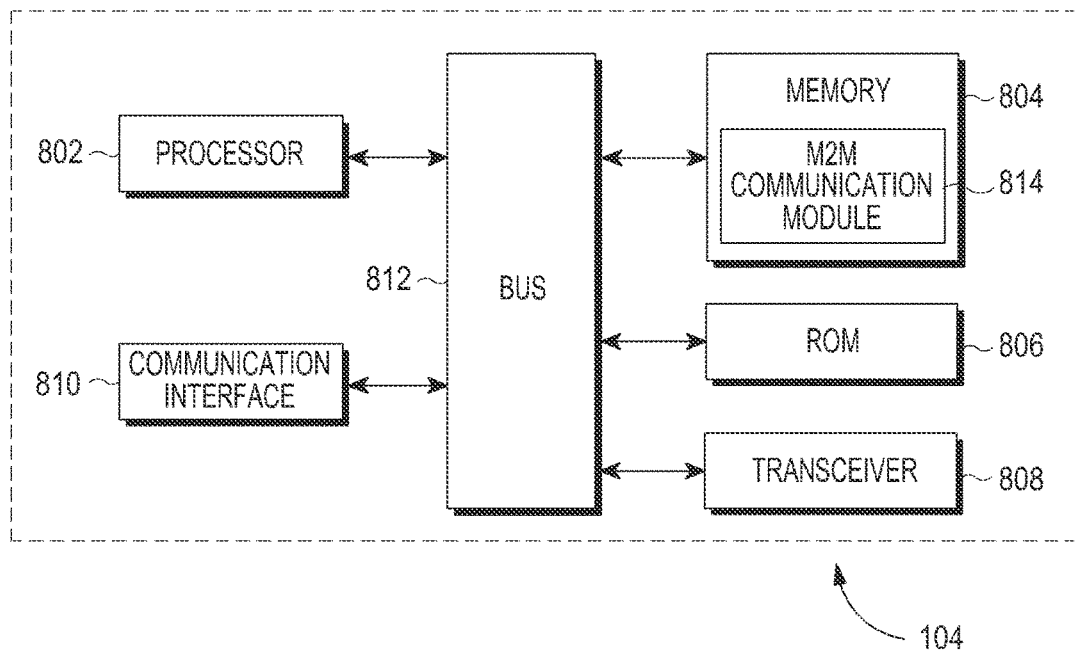
FIG. 8 illustrates a block diagram of a base station, such as those shown in FIG. 1 according to an embodiment of the present disclosure.

FIG. 8 illustrates a block diagram of the base station 104, such as those shown in FIG. 1 according to an embodiment of the present disclosure.

Referring to FIG. 8, the base station 104 includes a processor 802, memory 804, a Read Only Memory (ROM) 806, a transceiver 808, a communication interface 810, and a bus 812.

The processor 802, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 may be a volatile memory and non-volatile memory. The memory 804 may include a M2M communication module 814 for computing zone indexes corresponding to zone identifiers of associated M2M device group zones, selecting a zone index corresponding to a zone identifier associated with a M2M device group zone from the computed zone indexes and using the selected zone identifier in conjunction with a M2M device group identifier to communicate with a M2M devices of a M2M group in the M2M device group zone, according to the various embodiments illustrated in FIGS. 1 to 4. A variety of computer-readable storage media may be stored in and accessed from the memory elements. Memory elements may include any suitable memory device(s) for storing data and machine-readable instructions such as ROM, RAM, EPROM, EEPROM, HD, removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. The M2M communication module 814 may be stored in the form of machine-readable instructions on any of the above-mentioned storage media and is executable by the processor 802. For example, a computer program may include the machine-readable instructions capable of a M2M communication module 814 for computing zone indexes corresponding to zone identifiers of associated M2M device group zones, selecting a zone index corresponding to a zone identifier associated with a M2M device group zone from the computed zone indexes and using the selected zone identifier in conjunction with a M2M device group identifier to communicate with a M2M devices of a M2M group in the M2M device group zone, according to the teachings and herein described various embodiments of the present subject matter. The computer program may be included on a non-transitory computer-readable storage medium and loaded from the storage medium to a hard drive in the non-volatile memory.

The transceiver 808 is configured for transmitting/receiving information/data to/from M2M devices using a zone index in conjunction with a M2M device group identifier. The components such as the ROM 806, the communication interface 810, and the bus 812 are well known to the person skilled in the art and hence the explanation is thereof omitted.

Although, the present disclosure is described with reference to IEEE 802.16 system and in particular to IEEE 802.16.1 system, one can envision that the present disclosure is also applicable to other cellular communication standards without loss of generality. Therefore, the reference to 'IEEE 802.16.1' systems should be treated as purely exemplary in nature.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for performing communication by a machine to machine (M2M) device in an M2M communication system, the method comprising:
   receiving a broadcast message from a base station, the broadcast message including information associated with one or more zone identifiers, each zone identifier assigned to a different M2M group zone comprising multiple base stations associated with the base station;
   determining, at the M2M device, one or more zone indexes corresponding to the one or more zone identifiers based on an implicit ordering of the one or more zone identifiers in the broadcast message, each of the one or more zone indexes corresponding to a different zone identifier of the one or more zone identifiers;
   determining a first zone index from the one or more zone indexes based on an M2M device group to which the M2M device belongs, wherein the M2M device group is a group comprising a plurality of M2M devices; and
   performing communication with the base station by using an M2M device group identifier of the M2M device group and the determined first zone index,
   wherein the first zone index and the M2M device group identifier are allocated to the M2M device, and
   wherein the M2M device group identifier uniquely identifies the M2M device group within a M2M group zone identified by the first zone index.

2. The method of claim 1,
   wherein the one or more zone indexes are local indexes assigned to one or more M2M group zones associated with the base station.

3. The method of claim 1,
   wherein the determining of the first zone index is performed prior to receiving control information from the base station.

4. The method of claim 1, wherein the performing of the communication comprises:
   receiving a signaling message intended for M2M devices belonging to the M2M device group, the signaling message including a first M2M device group identifier and a second zone index;
   determining whether the first M2M device group identifier in the signaling message matches the M2M device group identifier associated with the M2M device group of the M2M device;
   determining whether the second zone index in the signaling message matches with the first zone index; and
   processing the signaling message if the second zone index in the signaling message matches the first zone index and the first M2M device group identifier in the signaling message matches the M2M device group identifier associated with the M2M device group of the M2M device.

5. The method of claim 1, wherein the performing of the communication comprises:
   receiving a signaling message intended for M2M devices of the M2M device group, the signaling message including a first M2M device group identifier;
   determining a cyclic redundancy check (CRC) mask corresponding to the first zone index from a set of CRC masks, each CRC mask being associated with each of the one or more determined zone indexes;
   decoding the signaling message using the determined CRC mask;
   determining whether the signaling message is successfully decoded using the determined CRC mask;
   determining whether the first M2M device group identifier in the signaling message matches the M2M device group identifier associated with the M2M device group of the M2M device if the signaling message is successfully decoded using the determined CRC mask; and
   processing the signaling message if the first M2M device group identifier in the signaling message matches the M2M device group identifier associated with the M2M device group of the M2M device.

6. The method of claim 1, wherein the performing of the communication with the base station by using the first zone index and the M2M device group identifier associated with the M2M device group of the M2M device comprises:
   receiving a signaling message intended for M2M devices of the M2M device group in a first M2M group zone, the signaling message including a first M2M device group identifier and a second zone index;
   decoding the signaling message using a CRC mask pre-specified for the M2M device group identifier associated with the M2M device group of the M2M device;
   determining whether the signaling message is successfully decoded using the CRC mask;
   determining whether the second zone index in the signaling message matches with the first zone index if the signaling message is successfully decoded using the CRC mask; and
   processing the signaling message if the second zone index in the signaling message matches the first zone index.

7. The method of claim 1, wherein a maximum number of M2M group zones supported by the base station is predetermined.

8. A method of performing communication by a base station in a machine to machine (M2M) communication system, the method comprising:
   determining, at the base station, one or more zone indexes corresponding to one or more zone identifiers based on an implicit ordering of the one or more zone identifiers in the broadcast message, each of the one or more zone indexes corresponding to a different zone identifier assigned to each of one or more M2M group zones comprising multiple base stations associated with the base station;
   determining, at the base station, a first zone index from the one or more zone indexes, based on a M2M device group in a first M2M group zone, wherein the M2M device group is a group comprising a plurality of M2M devices; and performing, at the base station, communication with M2M devices in the M2M device group by using a M2M device group identifier of the M2M device group and the determined first zone index, wherein the first zone index and the M2M device group identifier are allocated to the M2M devices, and wherein the M2M device group identifier uniquely identifies the M2M device group within a M2M group zone identified by the first zone index.

9. The method of claim 8, wherein the determining of the one or more zone indexes comprises:

transmitting a broadcast message to the M2M devices in the M2M device group, the broadcast message including information associated with one or more zone identifiers, and wherein the one or more zone indexes are local indexes assigned to the one or more M2M group zones associated with the base station.

10. The method of claim 8, wherein the performing of the communication comprises:

transmitting a signaling message including the M2M device group identifier and the first zone index to the M2M devices of the M2M device group in the first M2M group zone.

11. The method of claim 8, wherein the performing of the communication comprises:

including the M2M device group identifier of the M2M device group in a signaling message intended for the M2M devices in the M2M device group in the first M2M group zone;

determining a cyclic redundancy check (CRC) mask corresponding to the first zone index from a set of CRC masks, each CRC mask being in the set of CRC masks is associated with each of the one or more zone indexes;

applying a CRC on the signaling message including the M2M device group identifier using the determined CRC mask; and transmitting the signaling message including the M2M device group identifier to the M2M device group.

12. The method of claim 8, wherein the performing of the communication comprises:

including a second zone index in a signaling message intended for the M2M devices in the M2M device group in the first M2M group zone;

applying a cyclic redundancy check (CRC) on the signaling message including the first zone index using a pre-specified CRC mask corresponding to the M2M device group identifier of the M2M device group;

transmitting the signaling message including the second zone index to the M2M devices of the M2M device group in the first M2M group zone;

associating a set of Cyclic Redundancy Check (CRC) masks with the one or more zone indexes; and transmitting the set of CRC masks and the one or more zone indexes to one or more M2M devices in the first M2M group zone.

13. The method of claim 8, further comprising:

assigning the M2M device group identifier of the M2M device group and the first zone index of the first M2M group zone in which the M2M device group identifier is valid to the M2M devices of the M2M device group in the first M2M group zone.

14. The method of claim 8, wherein a maximum number of M2M group zones supported by the base station is predetermined.

15. A machine to machine (M2M) device in an M2M communication system, the M2M device comprising:

a memory configured to store instructions therein; and at least one processor, wherein, upon execution of the instructions, the at least one processor is configured to:

receive an indication that a broadcast message has been received from a base station, the broadcast message including information associated with one or more zone identifiers, each zone identifier assigned to a different M2M group zone comprising multiple base stations associated with the base station, determine one or more zone indexes corresponding to the one or more zone identifiers based on an implicit ordering of the one or more zone identifiers in the broadcast message, each of the one or more zone indexes corresponding to a different zone identifier of the one or more zone identifiers, determine a first zone index from the one or more zone indexes based on a M2M device group to which the M2M device belongs, wherein the M2M device group is a group comprising a plurality of M2M devices, and perform communication with the base station by using a M2M device group identifier of the M2M device group and the determined first zone index, and wherein the first zone index and the M2M device group identifier are allocated to the M2M device, and wherein the M2M device group identifier uniquely identifies the M2M device group within a M2M group zone identified by the first zone index.

16. The M2M device of claim 15, wherein the one or more zone indexes are local indexes assigned to the one or more M2M group zones associated with the base station.

17. The M2M device of claim 15, wherein the first zone index is determined prior to receiving control information from the base station.

18. The M2M device of claim 15, wherein the at least one processor is further configured to:

receive a signaling message intended for M2M devices belonging to the M2M device group, the signaling message including a first M2M device group identifier and a second zone index, determine whether the first M2M device group identifier in the signaling message matches the M2M device group identifier associated with the M2M device group of the M2M device, determine whether the second zone index in the signaling message matches with the first zone index, and process the signaling message if the second zone index in the signaling message matches the first zone index and the first M2M device group identifier in the signaling message matches the M2M device group identifier associated with the M2M device group of the M2M device.

19. The M2M device of claim 15, wherein the at least one processor is further configured to:

receive a signaling message intended for M2M devices of the M2M device group, the signaling message including a first M2M device group identifier, determine a cyclic redundancy check (CRC) mask corresponding to the first zone index from a set of CRC masks, each CRC mask being associated with each of the one or more zone indexes, decode the signaling message using the determined CRC mask, determine whether the signaling message is successfully decoded using the determined CRC mask, determine whether the first M2M device group identifier in the signaling message matches the M2M device group identifier associated with the M2M device group of the M2M device if the signaling message is successfully decoded using the determined CRC mask, and process the signaling message if the first M2M device group identifier in the signaling message matches the M2M device group identifier associated with the M2M device group of the M2M device.

20. The M2M device of claim 15, wherein the at least one processor is further configured to:

receive a signaling message intended for M2M devices of the M2M device group in the M2M group zone, the signaling message including a first M2M device group identifier and a second zone, decode the signaling message using a CRC mask pre-specified for the M2M device group identifier associated with the M2M device group of the M2M device, determine whether the signaling message is successfully decoded using the CRC mask, determine whether a second zone index in the signaling message matches with the first zone index if the signaling message is successfully decoded using the CRC mask, and process the signaling message if the second zone index in the signaling message matches the first zone index.

21. The M2M device of claim 15, wherein a maximum number of M2M group zones supported by the base station is predetermined.

22. A base station in a machine to machine (M2M) communication system, the base station comprising:

a memory configured to store instructions therein; and at least one processor, wherein, upon execution of the instructions, the at least one processor is configured to:

determine one or more zone indexes corresponding to one or more zone identifiers based on an implicit ordering of the one or more zone identifiers in the broadcast message, each of the one or more zone indexes corresponding to a different zone identifier assigned to each of one or more M2M group zones comprising multiple base stations associated with the base station, determine a first zone index from the one or more zone indexes based on a M2M device group in a first M2M group zone, wherein the M2M device group is a group comprising a plurality of M2M devices, and perform communication with M2M devices in the M2M device group by using a M2M device group identifier of the M2M device group and the determined first zone index, and wherein the first zone index and the M2M device group identifier are allocated to the M2M devices, and wherein the M2M device group identifier uniquely identifies the M2M device group within a M2M group zone identified by the first zone index.

23. The base station of claim 22, wherein the at least one processor is further configured to:

transmit a broadcast message to the M2M devices in the M2M device group, the broadcast message including information associated with the one or more zone identifiers, and wherein the one or more zone indexes are local indexes assigned to the one or more M2M group zones associated with the base station.

24. The base station of claim 22, wherein the at least one processor is further configured to:

transmit a signaling message including the M2M device group identifier and the first zone index to the M2M devices of the M2M device group in the first M2M group zone.

25. The base station of claim 22, wherein the at least one processor is further configured to:

include the M2M device group identifier of the M2M device group in a signaling message intended for the M2M devices in the M2M device group in the first M2M group zone, determine a cyclic redundancy check (CRC) mask corresponding to the first zone index from a set of CRC masks, each CRC mask in the set of CRC masks being associated with each of the one or more zone indexes, apply a CRC on the signaling message including the M2M device group identifier using the determined CRC mask, and transmit the signaling message including the M2M device group identifier to the M2M device group.

26. The base station of claim 22, wherein the at least one processor is further configured to:

include the first zone index in a signaling message intended for the M2M devices in the M2M device group in the first M2M group zone, apply a cyclic redundancy check (CRC) on the signaling message including the first zone index using a pre-specified CRC mask corresponding to the M2M device group identifier of the M2M device group, transmit the signaling message including the first zone index to the M2M devices of the M2M device group in the first M2M group zone, associate a set of Cyclic Redundancy Check (CRC) masks with the one or more zone indexes, and transmit the set of CRC masks and the one or more zone indexes to one or more M2M devices in the first M2M group zone.

27. The base station of claim 22, wherein the at least one processor is further configured to:

assign the M2M device group identifier of the M2M device group and the first zone index of the first M2M group zone in which the M2M device group identifier is valid to the M2M devices of the M2M device group in the first M2M group zone.

28. The base station of claim 22, wherein a maximum number of M2M group zones supported by the base station is predetermined.

* * * * *